United States Patent
Heppner et al.

(10) Patent No.: US 11,008,796 B2
(45) Date of Patent: May 18, 2021

(54) WINDOW LIFTER ASSEMBLY

(71) Applicant: BROSE FAHRZEUGTEILE GMBH & CO. KOMMANDITGESELLSCHAFT, BAMBERG, Bamberg (DE)

(72) Inventors: Matthias Heppner, Burgkunstadt (DE); Manuel Griesmann, Stoetten am Auerberg (DE); Andre Carl, Coburg (DE); Sebastian Schneider, Bayreuth (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 15/554,680

(22) PCT Filed: Apr. 19, 2016

(86) PCT No.: PCT/EP2016/058627
§ 371 (c)(1),
(2) Date: Aug. 30, 2017

(87) PCT Pub. No.: WO2016/169920
PCT Pub. Date: Oct. 27, 2016

(65) Prior Publication Data
US 2018/0044962 A1    Feb. 15, 2018

(30) Foreign Application Priority Data

Apr. 22, 2015 (DE) .................... 10 2015 207 315.7

(51) Int. Cl.
*E05F 11/48* (2006.01)
*E05F 11/38* (2006.01)
*B60J 1/00* (2006.01)

(52) U.S. Cl.
CPC ............. *E05F 11/483* (2013.01); *B60J 1/008* (2013.01); *E05F 11/385* (2013.01)

(58) Field of Classification Search
CPC . E05F 11/483; E05F 11/385; E05F 2011/387; B60J 1/008
See application file for complete search history.

(56) References Cited

U.S. PATENT DOCUMENTS 5,685,111 A * 11/1997 Zimmerer ............... E05F 15/57
                                                      49/352
6,088,965 A *  7/2000 Fukumoto ............. E05F 11/486
                                                      49/352

(Continued)

FOREIGN PATENT DOCUMENTS

DE        19703720 A1    7/1998
DE        10039688 A1 *  3/2002 ............ E05F 11/385

(Continued)

*Primary Examiner* — Gregory J Strimbu
(74) *Attorney, Agent, or Firm* — Lewis Roca Rothgerber Christie LLP

(57) ABSTRACT

A window lifter assembly includes a window pane which includes a connecting portion to which an adapter is molded, the adapter thereby being an integral part of the window pane, the adapter forming a driver element for moving the window pane along an adjustment direction and forming a supporting structure which extends in the adjustment direction and in a transverse direction and running generally perpendicular to the adjustment direction and parallel to a pane plane defined by the window pane, wherein an extension of the supporting structure along the transverse direction is at least twice as large as an extension of the driver element along the transverse direction.

12 Claims, 7 Drawing Sheets

(56) References Cited

U.S. PATENT DOCUMENTS

| | | | |
|---|---|---|---|
| 6,931,791 B1 | 8/2005 | Pleiss | |
| 2006/0010775 A1* | 1/2006 | Tao | E05F 11/385 49/375 |
| 2008/0005971 A1 | 1/2008 | Dickie et al. | |
| 2009/0019775 A1 | 1/2009 | Kruger et al. | |
| 2009/0064590 A1 | 3/2009 | Sasaki et al. | |
| 2009/0090064 A1* | 4/2009 | Tudora | E05F 11/385 49/348 |
| 2011/0010999 A1* | 1/2011 | Broadhead | B60J 5/0416 49/352 |
| 2011/0068609 A1 | 3/2011 | Saito et al. | |
| 2017/0016258 A1* | 1/2017 | Taubmann | E05F 11/382 |

FOREIGN PATENT DOCUMENTS

| | | |
|---|---|---|
| DE | 102004063514 A1 | 7/2006 |
| DE | 102005036866 A1 | 2/2007 |
| DE | 102011085741 A1 | 5/2013 |
| DE | 102013209321 A1 | 11/2014 |
| EP | 2 589 737 A1 | 5/2013 |
| JP | 2004068506 A | 3/2004 |
| WO | WO 01/07277 A1 | 2/2001 |
| WO | WO 2011/006846 A1 * | 1/2011 |

* cited by examiner

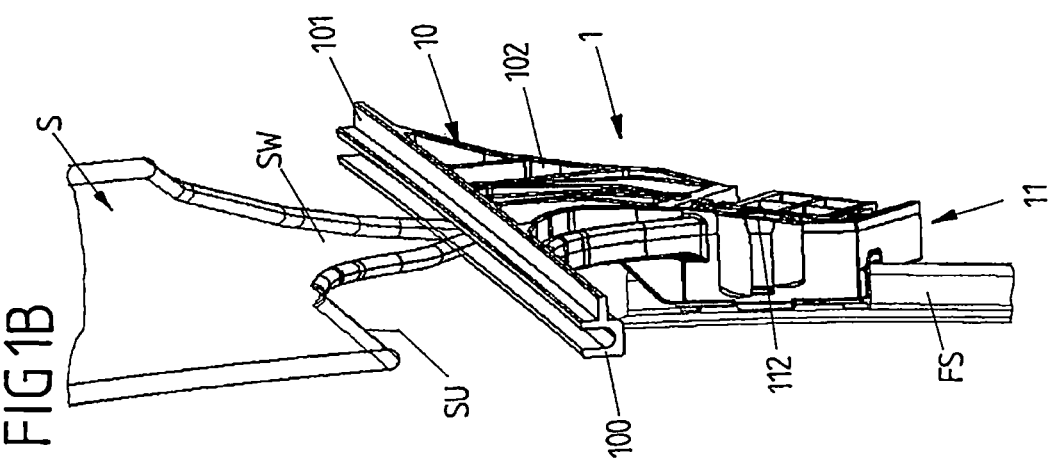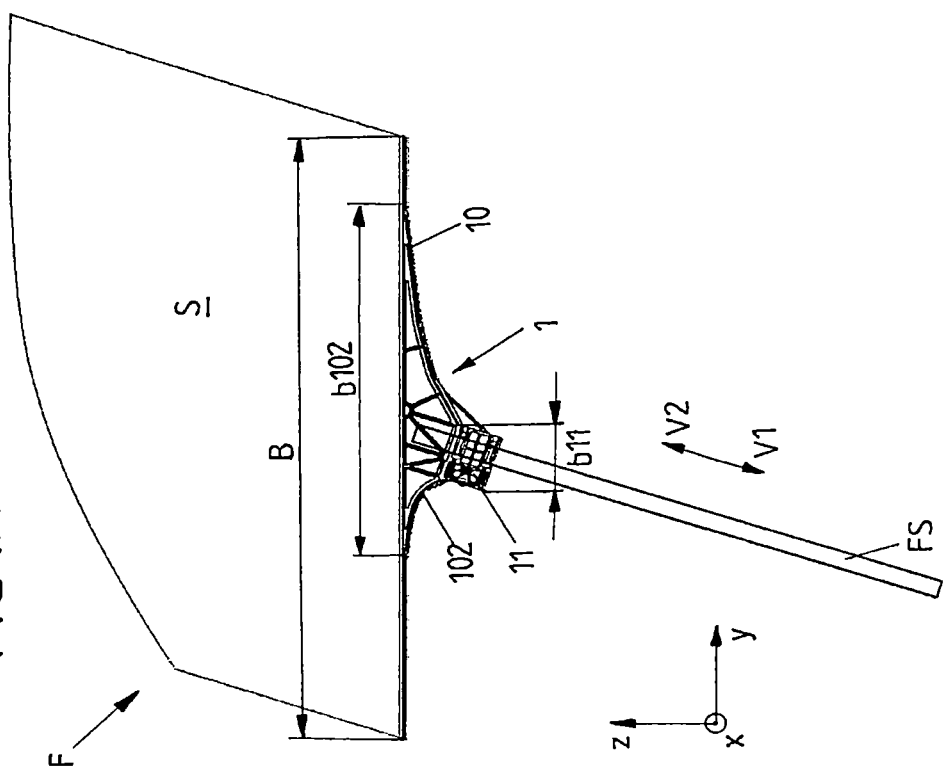

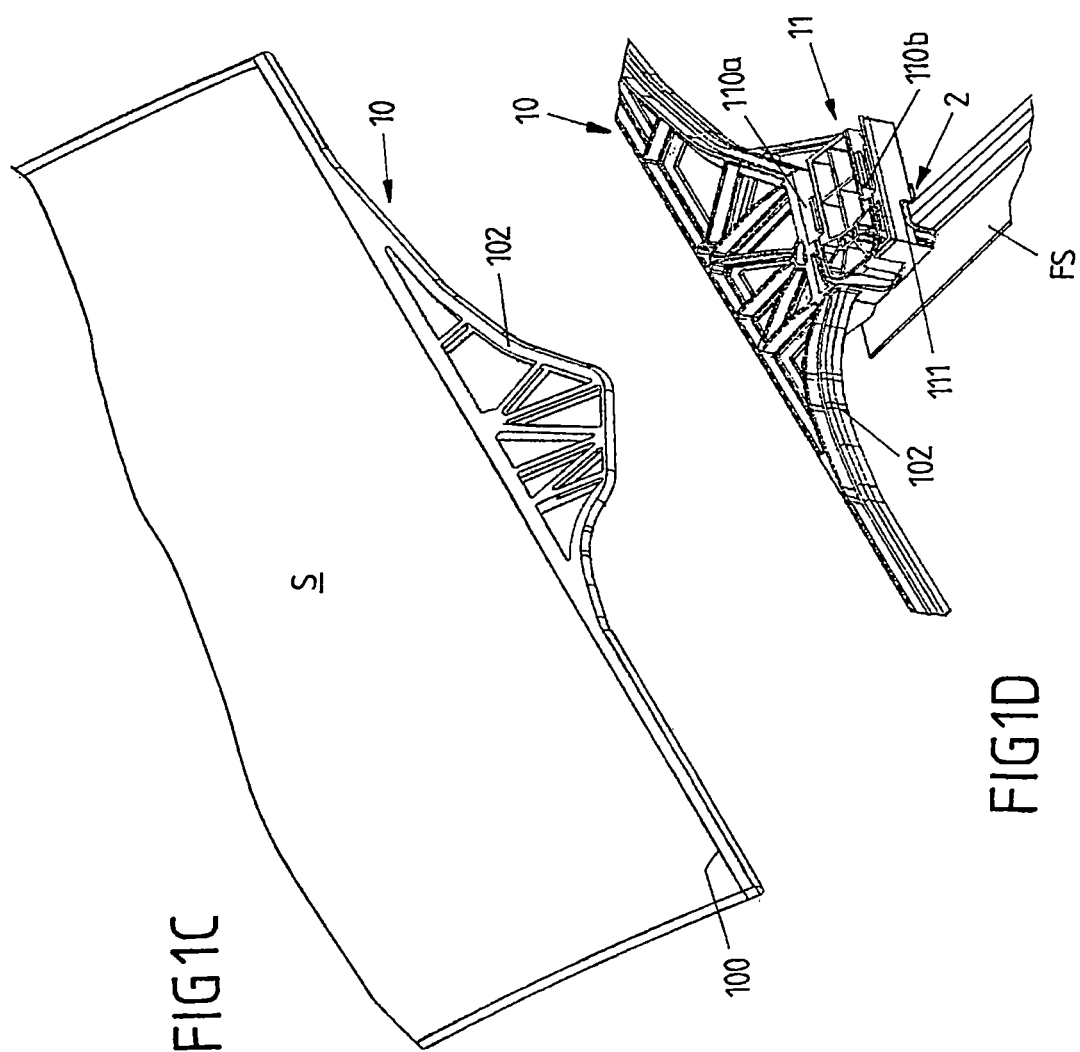

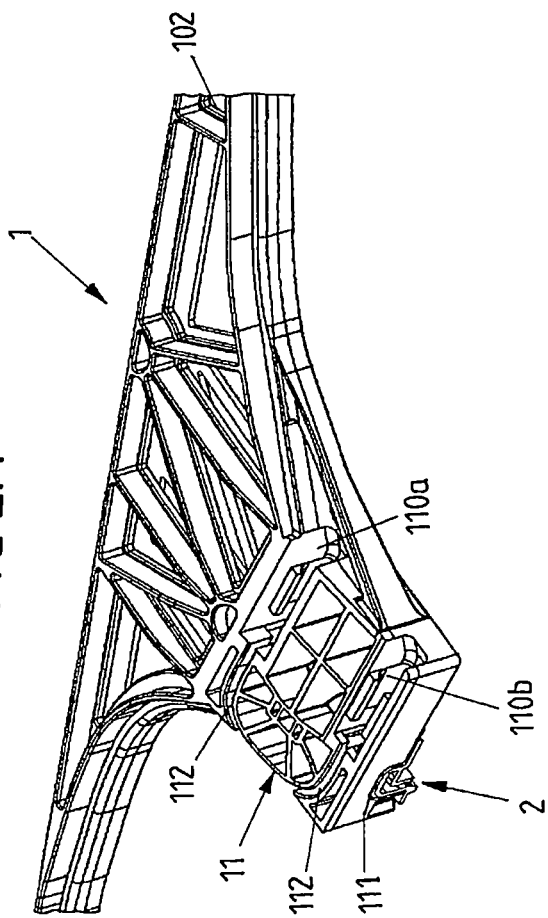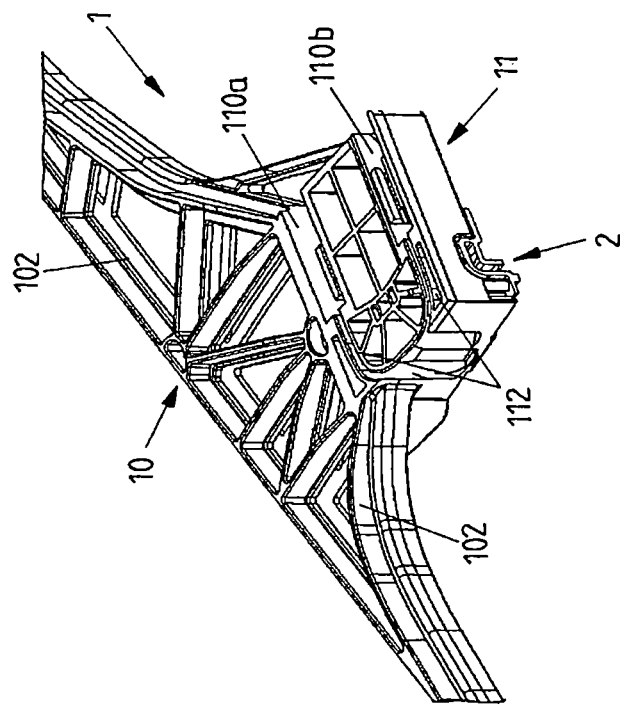

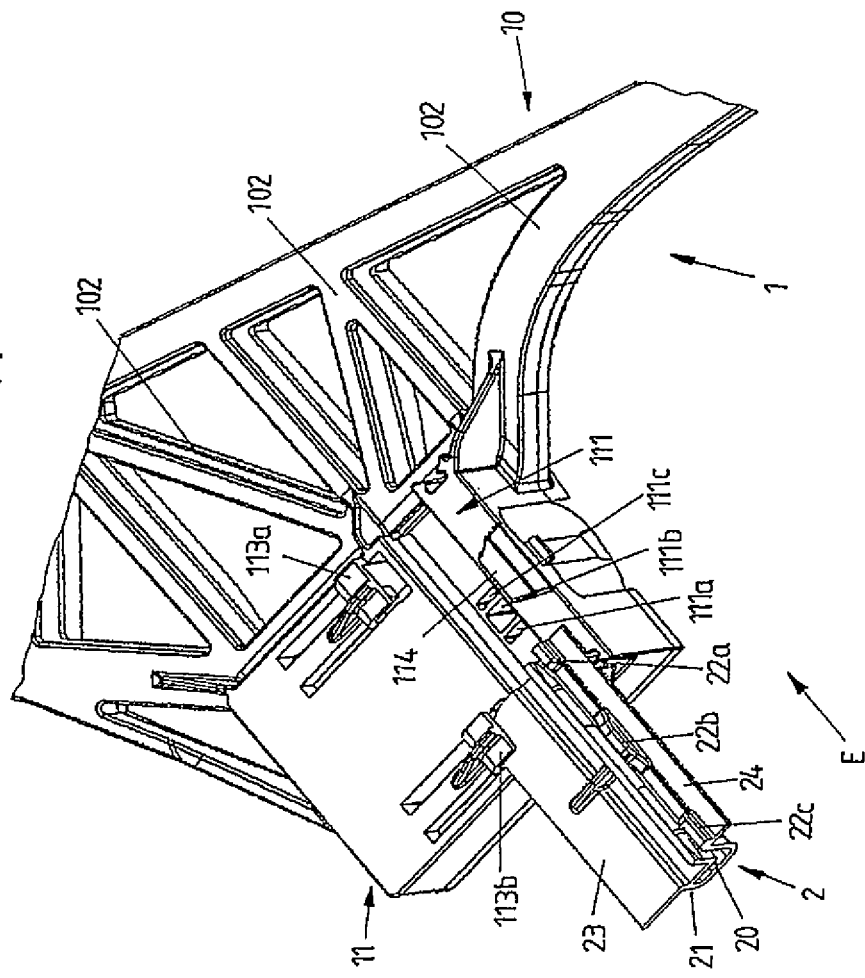
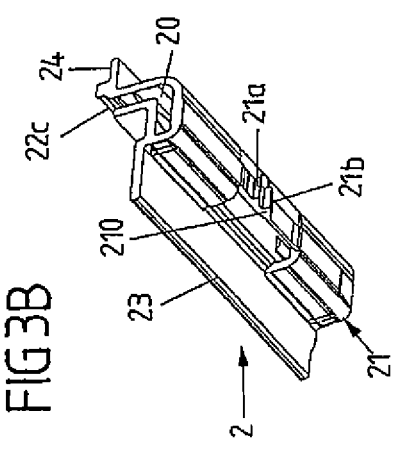
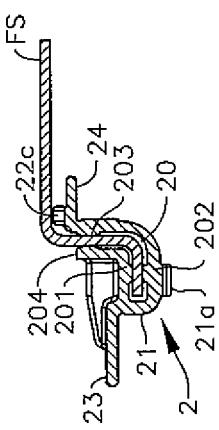

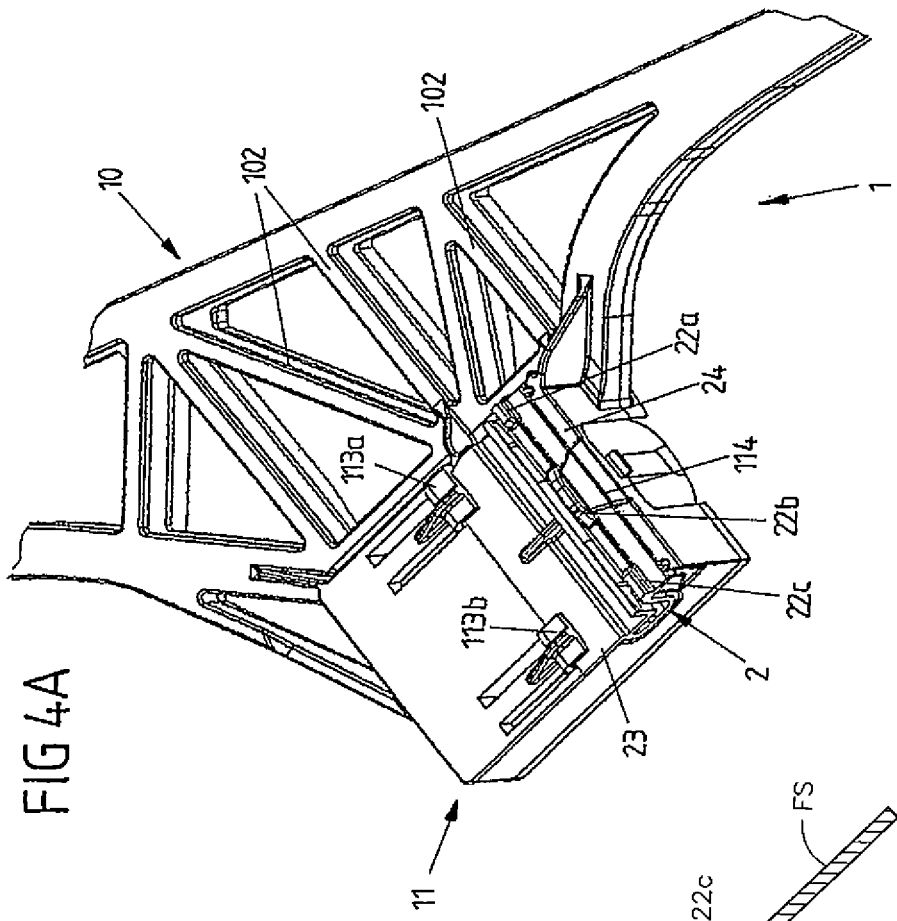

WINDOW LIFTER ASSEMBLY

CROSS-REFERENCE TO A RELATED APPLICATION

This application is a National Phase Patent Application of International Patent Application Number PCT/EP2016/058627, filed on Apr. 19, 2016, which claims priority of German Patent Application Number 10 2015 207 315.7, filed on Apr. 22, 2015, the contents of both of which are incorporated herein by reference.

BACKGROUND

The present invention in particular relates to a window lifter assembly.

Such window lifter assembly includes at least one flexible traction means for the transmission of an adjusting force for the adjustment of a window pane. Via the traction means, for example in the form of a Bowden cable, a driver element connected with the window pane is adjusted along an adjustment direction specified by at least one guide rail of the window lifter assembly. For this purpose, the flexible traction means is connected with the driver element. The flexible traction means can be driven manually or via a motorized drive, in order to adjust the driver element and lift or lower the window pane.

As described in DE 197 03 720 A1 it can be provided, for example, that the driver element and the window pane are positively connected with each other via a snap connection. Such solution can be advantageous in particular in window panes made of a plastic material and represent a compromise between sufficiently easy mountability and mechanical loadability.

It likewise is known to connect the driver element with a possibly separately manufactured sliding element, via which the driver element is shiftably held on the guide rail. The driver element usually is made of a more slidable material, such as polyoxymethylene, than the driver element, which in particular due to the formation of at least one interface for the connection with the flexible traction means above all must be designed with sufficient strength. Such interface is formed for example by a nipple chamber, which positively accommodates a cable nipple of a Bowden cable.

In the case of driver elements positively and/or non-positively connected with a (plastic) window pane, the problem always is to avoid relative movements between the pane and the driver element in operation of the window lifter or to at least keep them as small as possible. For this purpose, damping means usually are to be provided on the driver element. In addition, an individually manufactured driver element connected with the window pane e.g. via a clip or snap connection regularly must be manufactured from a comparatively expensive polyamide, in order to withstand the loads occurring in operation. Furthermore, the manufacture and the assembly of a driver element with a sliding element fabricated from another material possibly can be comparatively expensive and cost-intensive.

SUMMARY

It therefore is the object of the present invention to further improve a window lifter assembly in particular in this respect.

This object is solved with window lifter assemblies as described herein.

According to a first aspect of the invention a window lifter assembly is proposed, which includes at least the following:
- a (vehicle) window pane to be adjusted along an adjustment direction, wherein the adjustment direction is specified by at least one guide rail of the window lifter assembly,
- a flexible traction means, for example a Bowden cable, for the transmission of an adjusting force for the adjustment of the window pane,
- a driver element which is connected with the window pane and the traction means, and
- a sliding element connected with the driver element, via which the driver element is shiftably held on the guide rail.

According to the invention there is provided an adapter integrally molded to a connecting portion of the window pane, which forms a supporting structure extending in particular in adjustment direction and substantially transversely thereto as well as the driver element. An extension of the supporting structures along a transverse direction extending substantially transversely to the adjustment direction and substantially parallel to a pane plane defined by the window pane is at least twice as large as an extension of the driver element along the transverse direction.

According to the first aspect of the invention an adapter hence is integrally formed with a supporting structure and the driver element forming the interface for the connection of the flexible traction means and is integrally molded to the window pane. Preferably, the width of the supporting structure along the transverse direction extending parallel to the pane plane is at least twice as large as a projected width of the driver element along this transverse direction. In this way, not only a particularly stable and backlash-free connection between window pane and driver element is achieved by the adapter integrally molded to the window pane, but due to the pronounced supporting structure also an improved guiding stability and loadability, which possibly also permits the use of a less expensive manufacturing material. Since the adapter forming the supporting structure and the driver element is integrally molded to the window pane, a reduction of the parts of the window lifter assembly to be mounted separately is achieved in addition. Furthermore, the mountability of the window lifter assembly is simplified.

In a preferred exemplary embodiment the supporting structure in the region of a pane lower edge of the window pane extends over a large part or over the entire width of the window pane transversely to the adjustment direction. In this way, a local reinforcement of the window pane in the region of its pane lower edge can be achieved via the supporting structure of the adapter. This can be advantageous in particular in a vehicle window pane which is at least partly made of a plastic material.

In one design variant the supporting structure is designed tapering in direction of the driver element. In this way, an improved introduction and distribution of forces can be achieved for the loads occurring in operation between window pane and driver element.

Against the background of an improved distribution of forces and utilization of installation space it can also be provided that the supporting structure forms a rib structure. An extension of this rib structure along the transverse direction preferably is at least twice as large as the extension of the driver element along the transverse direction. For example, the integrally molded adapter can extend over a large part or over the entire width of the window pane, so that the width of the supporting structure in the region of the pane lower edge exceeds the (projected) width of the driver element along the transverse direction at least by a factor of three or four. The width of the rib structure along the transverse direction is smaller than the entire width of the supporting structure, but nevertheless exceeds the (projected) width of the driver element at least by a factor of two.

In one exemplary embodiment the connecting portion of the window pane, to which the adapter is integrally molded, is formed to protrude from a pane lower edge of the window pane. In one development, this connecting portion is formed to protrude in a sword-shaped manner. Due to the sword-shaped geometry of the connecting portion a larger surface is available for integrally molding the adapter. Furthermore, an additional reinforcement thereby is achieved. For example, the rib structure of the adapter can straightly extend over the sword-shaped connecting portion.

In principle, the solution according to the invention is recommendable in window panes for vehicles which are at least partly made of a plastic material. The adapter which forms the supporting structures and the driver element or a driver element base body provided for the connection with the flexible traction means here can be integrally molded to the plastic window pane and preferably to its connecting portion made of the plastic material. Preferably, the supporting structure hence in particular is injection-molded to the (plastic) window pane and its connecting portion in one injection molding process.

In one design variant the adapter additionally includes a manipulation protection element via which an engagement of a manipulation tool guided along the window pane past the adapter is blocked. In the installed condition of the window lifter assembly the manipulation protection element provided at the adapter thus serves the burglary protection and should prevent that via a manipulation tool an unauthorized lowering of the window pane or an unauthorized opening of a vehicle door lock is effected. For this purpose the manipulation protection element for example is formed longitudinally extended and extending along the transverse direction.

In a design variant for a particularly effective burglary protection the manipulation protection element extends over a large part or even the entire width of the window pane in the region of the pane lower edge. The manipulation protection element for example can extend an angle to the pane plane at least with a portion thereof, in order to prevent in the installed condition of the window lifter assembly, for example in a vehicle door, that a manipulation tool can be introduced across the manipulation protection element into a body interior space, in particular into a door interior space, when the window pane is closed. The manipulation protection element for example can form a continuous transverse web extending along the transverse direction at the adapter. Preferably, the manipulation protection element including its transverse web likewise is integrally formed with the supporting structure and the driver element and hence integrally molded to the adapter, preferably in the region of an outer side of the adapter facing the exterior space, when properly mounted in a vehicle.

According to a further aspect of the invention a window lifter assembly is provided, in which an adapter need not necessarily be provided. In this respect it is essential for the invention that a driver element of the window lifter assembly is connected with a sliding element designed as separate component and for example made of a friction-optimized material such as polyoxymethylene (POM) via at least two-stage latching connection. The sliding element connected with the driver element is in engagement with the guide rail, in order to shiftably hold the driver element on the guide rail. Via the at least two-stage latching connection the sliding element and the driver element can be arrested relative to each other in a mounting position and a functional position different therefrom. In the mounting position a relative movement between sliding element and driver element furthermore is made possible via the latching connection such that the sliding element and the driver element take the functional position when the driver element for the first time is adjusted into an end position by means of the sliding element, which end position corresponds to an end position of the window pane, hence to a completely closed or maximally open position of the window pane.

Via the latching connection between sliding element and driver element two different relative positions of said two elements relative to each other thus are specified, wherein the two elements initially can be fixed at each other in a first position, the mounting position, for mounting purposes. The arrangement of the sliding element and the driver element at each other as well as the latching connection here for example are designed such that after the pre-assembly the two elements permanently take their second position, the functional position, relative to each other, which is provided for the proper operation, when during the assembly process and after being properly mounted, for example in a vehicle door, the driver element for the first time is adjusted into an (upper or lower) end position.

For this purpose, the latching connection can be formed such that an arrestment via the latching connection between the sliding element and the driver element, which is present in the mounting position, is releasable and the driver element and the sliding element automatically take the functional position relative to each other and are arrested in the same, when the driver element and the sliding element for the first time are jointly adjusted into the end position via the flexible traction means. Consequently, a part of the adjusting force usable for the adjustment of the window pane and transmitted to the driver element via the flexible traction means here is used to have the sliding element and the driver element take their functional position.

In one exemplary embodiment the sliding element and the driver element for this purpose are shiftably held relative to each other, so that with the adjustment of the driver element into the respective end position a displacement of the driver element relative to the sliding element or vice versa a displacement of the sliding element relative to the driver element is effected, in order to take the functional position. It can be provided, for example, that in the mounting position the sliding element with one portion protrudes from the driver element in adjustment direction. On adjustment of the driver element into the end position lying in the adjustment direction the sliding element then strikes against a stop and thereby is blocked against a further adjustment in adjustment direction. The latching connection between sliding element and driver element now is formed here such that by the adjusting force acting on the driver element in adjustment direction the arrestment between sliding element and driver element is released and the driver element is further adjustable in the adjustment direction relative to the sliding element. When the driver element has been adjusted sufficiently far in the adjustment direction and the sliding element and the driver element take the functional position relative to each other, both elements again lock into place with each other and thus are arrested in the functional position relative to each other.

The arrestment via the latching connection in the functional position can be designed such that in normal operation of the window lifter assembly this arrestment only can be released again by means of a tool, in order to e.g. release an engagement of a latch or of several latches of the latching connection into a respectively associated latch opening of the latching connection. On the other hand, the arrestment in the mounting position can be designed such that even a manual release of the arrestment still is permitted without using any tool. For the arrestment of the sliding element and the driver element in the mounting position and the functional position a pairing between at least one latch or latching nose and a latch opening each is preferably provided. For example, at least one flexible latch of the latching connection and/or a latch mounted on a flexible portion cooperates with at least two different latch openings, in order to specify the mounting position and the functional position. The latch openings here can be arranged one behind the other along an adjustment direction, so that a latch can get in engagement with the next latch opening by shifting one of the elements relative to the other element. The mounting opening thus is specified via the one latch opening and the functional position via the other latch opening.

In an alternative design variant at least one flexible first latch and/or first latch mounted on a flexible portion cooperates with a first latch opening for specifying the mounting position, while for specifying the functional position a further, second latch cooperates with the first latch opening or with a further, second latch opening. In contrast to the aforementioned design variant, in which only one latch with two different latch openings is provided for specifying the at least two positions, at least two latches hence are provided here, which depending on the relative position of the driver element and the sliding element to each other are in engagement with the first latch opening and/or with the second latch opening.

In principle, one latch can be provided on the driver element and one latch opening on the sliding element, or vice versa.

In one exemplary embodiment the sliding element and the driver element can manually be arranged in the mounting position and be arrested at each other via the latching connection. The latching connection thus is designed such that the sliding element and the driver element can manually be arranged in the mounting position relative to each other and be arrested at each other by a mechanic.

Alternatively or in addition, the sliding element can be premountable to the guide rails before its connection with the driver element and subsequently be connectable with the driver element via the at least two-stage latching connection. In this design variant the sliding element hence initially is shiftably premounted to the guide rail. In a succeeding mounting step the driver element then is—preferably manually—connected with the sliding element, so that the two elements are in the mounting position. Only in a succeeding mounting step, for example by actuation of an electromotive drive of the window lifter assembly and by adjusting the driver element into one of the possible end positions, as explained above, a relative movement between the sliding element and the driver element then is enforced, via which the elements get into their functional position and are automatically arrested in the same.

In the mounting position, the sliding element can shiftably be mounted on or in the driver element along a shifting direction and/or in the mounting position the driver element (conversely) can shiftably be mounted on or in the sliding element along a shifting direction. Hence, via the latching connection not only an arrestment of the two elements at each other is provided in the mounting position. Rather, a form fit between the sliding element and the driver element furthermore is provided, in order to shiftably hold the two elements at each other, when an arrestment provided via the latching connection is released.

For the shiftable support and/or for securing the same at least two gripping portions facing each other transversely to the shifting direction can be provided, which each at least partly enclose an edge of the respective shiftably mounted element. Via the gripping portions facing each other the two elements thus are positively connected with each other and at the same time are shiftably held relative to each other along the shifting direction.

In the aforementioned exemplary embodiments relating to the second aspect of the invention with a sliding element designed as separate component it can of course likewise be provided that the driver element is formed by an adapter which is integrally molded to a connecting portion of a (plastic) window pane to be adjusted. Corresponding to the first aspect of the invention, such adapter then can also include a supporting structure.

Via a window lifter assembly according to the second aspect of the invention an improved method for mounting a window lifter assembly can also be provided. By means of the at least two-stage latching connection the sliding element initially can be premounted to the guide rail of the window lifter assembly and can manually be connected with the driver element, so that the sliding element and the driver element are arrested in their mounting position via the at least two-stage latching connection. Via the latching connection a pre-latching position thus is specified, in which a latch of one of the two elements engages into a latch opening of the other element associated to the mounting or pre-latching position. By applying an adjusting force via the flexible traction means connected with the driver element, the driver element subsequently is adjusted into an end position. The sliding element and the driver element thereby take their functional position and are arrested in the same via the latching connection.

The solution according to the invention above all is regarded as advantageous for a vehicle cable window lifter, in which a flexible traction means is formed by a Bowden cable.

BRIEF DESCRIPTION OF THE DRAWINGS

Further advantages and features of the invention will become apparent from the following description of exemplary embodiments with reference to the Figures.

FIGS. 1A to 1E show respectively, a side view, a first perspective view, a second perspective view, a third perspective view, and a fourth perspective view of an exemplary embodiment of a window lifter assembly with an adapter integrally molded to a plastic side window, which forms a driver element with a sliding element locked into place thereon.

FIGS. 2A to 2B show, respectively, a first perspective view and a second perspective view of a supporting structure and the driver element of the adapter on an enlarged scale.

FIG. 3A on an enlarged scale shows the adapter with the supporting structure and the driver element and a sliding element only partly inserted into the driver element.

FIG. 3B shows a perspective view of the sliding element.

FIG. 3C shows a sectional representation of a guide rail of the window lifter assembly with the sliding element shiftably mounted thereon.

FIG. 4A in a view corresponding with FIG. 3A shows the adapter with the driver element and the sliding element inserted therein in a proper functional position.

FIG. 4B shows a further sectional representation of the guide rail with the sliding element shiftably held thereon.

DETAILED DESCRIPTION

Figure 1E:
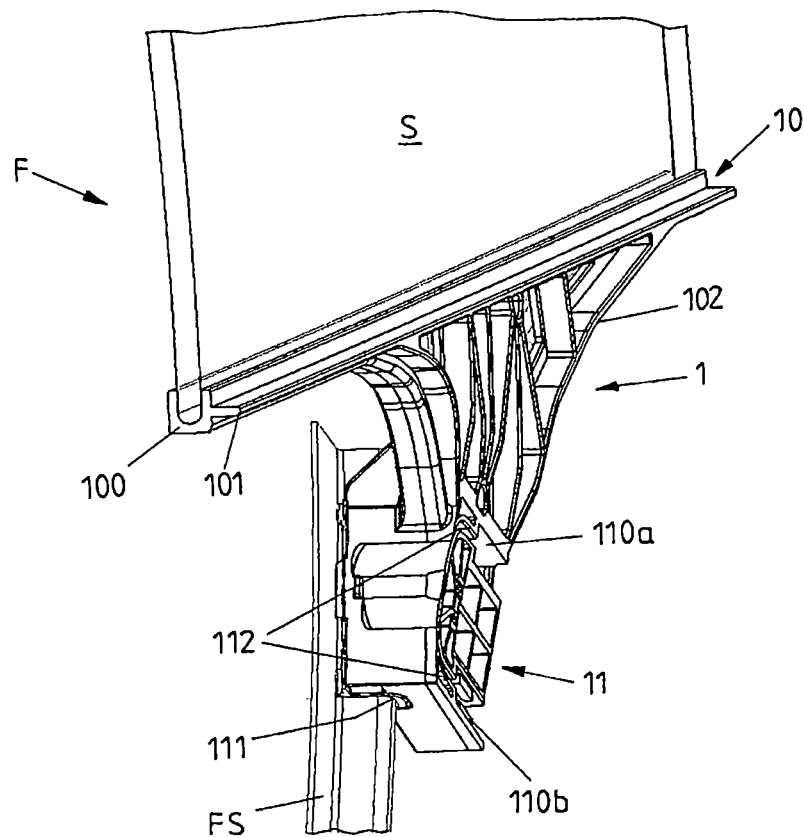

FIGS. 1A to 1E in different views show an exemplary embodiment of a window lifter assembly F according to the invention, in which a window pane to be adjusted in the form of a side window S is adjustable along a guide rail FS. The adjustment is effected via a non-illustrated flexible traction means in the form of a Bowden cable. This Bowden cable is positively connected with a driver element 11 via cable nipples provided at its ends. The driver element 11 is shiftably held at the guide rail FS and connected with the side window S.

The driver element 11 here is formed by an adapter 1 which is integrally molded in the region of a pane lower edge SU of the side window S. The side window S is designed as plastic window pane and hence at least partly made of a plastic material. The adapter 1 is injection-molded to the side window S by an injection molding or injection compression molding method and hence integrated into the side window S. The adapter 1 with the driver element 11 hence for example need not be connected with the side window S via a latching or clip connection. By integrally molding the adapter 1 to the side window S it also is ensured that a relative movement between the side window S and the driver element 11 cannot occur in operation of the window lifter.

For a more loadable and more stable connection between the adapter 1 and the side window S the adapter 1 forms a supporting structure 10 in addition to the driver element 11. This supporting structure 10 forms a connection between the pane lower edge SU and the driver element 11 at which the adjusting forces for adjusting the side window S are introduced. The supporting structure 10 extends across the entire width B of the side window S in the region of the pane lower edge SU. To provide a connection to the side window S optimized in terms of force introduction to the driver element 11, which is distinctly smaller in its dimensions, in particular smaller with respect to the width B, the supporting structure 10 tapers in direction of the driver element 11. The tapering region is provided with a rib structure 102.

The rib structure 102 above all is formed in the region of a connecting portion of the side window S formed as connecting sword SW and is injection-molded to this connecting sword SW. The connecting sword SW protrudes from the pane lower edge SU. In that the side window S is locally increased in a region in which the connection of the driver element 11 is effected, an increased connecting surface is provided for the adapter 1 with the driver element 11 and the supporting structure 10. The rigidity of the subassembly defined by the adapter 1 and the side window S thereby is further increased.

In the region of the pane lower edge SU the rib structure 102 extends with a maximum width b102 along a transverse direction y which extends substantially transversely to the adjustment directions V1 and V2 defined by the guide rail FS for lowering and lifting the side window S and substantially parallel to the pane plane defined by the side window S. The maximum width b102 of the rib structure 102 provided approximately centrally at the pane lower edge SU here extends over about half of the (entire) width B of the side window S in the region of its pane lower edge SU.

A width b11 of the driver element 11 projected onto the transverse direction y here is distinctly smaller than the width b102 of the rib structure 102 and hence also distinctly smaller than the entire width B of the adapter 1. For a stability and rigidity regarded as advantageous with comparatively little use of material, the width b102 of the rib structure 102 tapering from the pane lower edge SU in direction of the driver element 11 and hence the entire width B of the adapter 1 is at least twice as large as the width B11 of the driver element 11 projected onto the transverse direction y.

In the region of the pane lower edge SU the supporting structure 10 of the adapter 1 forms a groove-like cutout 100. The adapter 1 with the supporting structure 10 hence is injection-molded to the side window S, preferably from a plastic material, such that the pane lower edge SU is enclosed by the supporting structure 10 over its entire width B and accommodated in the groove-like cutout 100.

In the region of the cutout 100 the adapter 1 furthermore forms a manipulation protection element in the form of a protruding transverse or protective web 101. This protective web 101 protrudes from the adapter 1 in a direction which runs substantially perpendicular to the adjustment directions V1 and V2. In the properly installed condition of the window lifter assembly F the protective web 101 protrudes in direction of a vehicle outer side. Via the protective web 101 it should be prevented that with closed side window S a manipulation tool inadmissibly is introduced into a vehicle door along the side window S and past the adapter 1, in order to for example undesirably lower the side window S or open the vehicle door. The longitudinally extended protective web 101 here extends across the entire width B of the side window S in the region of the pane lower edge SU and at an angle of 90° to the pane plane of the side window S.

As is illustrated in particular in the synopsis with FIGS. 2A and 2B, the driver element 11 integrally molded to the side window S via the adapter 1 forms two interfaces, on the one hand a first interface for the connection with the Bowden cable and on the other hand a second interface for a separate sliding element 2, via which the driver element 11 and hence the side window S is shiftably held on the guide rail FS.

For the connection with the Bowden cable two nipple chambers 110a and 110b are provided on the driver element 11 of the (plastic) adapter 1. These nipple chambers 110a and 110b serve to accommodate cable nipples of the Bowden cable and of possibly additionally provided elements for damping and for cable length compensation in the form of springs or dampers. Furthermore a cable guide 112 also is formed on the driver element 11, in order to be able to place the cable ends with the cable nipples on the driver element 11 and deflect the same in a guided way.

For the connection with a sliding element 2 a longitudinally extended, channel-shaped receptacle 111 furthermore is formed on the driver element 11 on a side of the driver element 11 opposite the nipple chambers 110a and 110b. The sliding element 2 here is held on the driver element 11 via a two- or three-stage latching connection, in order to specify different relative positions to each other for the driver element 11 and the sliding element 2, in which positions the two elements 11 and 2 each are arrested relative to each other. This will yet be explained in more detail below.

Figure 5A:
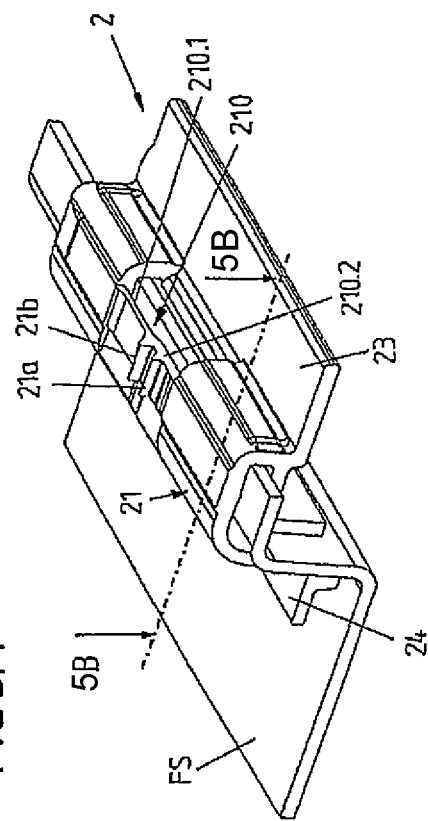
FIGS. 5A to 5B show, on an enlarged scale, respectively, a perspective view and a sectional view, of the sliding element properly held on a portion of the guide rail.
Figure 5B:
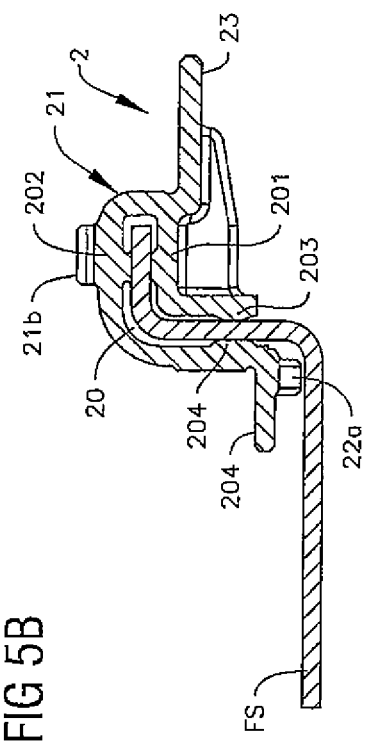

FIGS. 3A to 3C, 4A to 4B and 5A to 5B illustrate further details of the adapter 1 integrally molded to the side window S and in particular of the driver element 11 formed by the same. FIGS. 3A and 3B show the sliding element 2 each with a view to (referring to the future mounting situation) an inner side in a condition in which the sliding element 2 is partly or completely inserted into the driver element 11.

The sliding element 2 therefor is formed with a longitudinally extended protrusion 21 which can be inserted into the channel-like receptacle 111 of the driver element 11 along the mounting direction E. Furthermore, the sliding element 2 is shiftable relative to the driver element 11 via retaining tabs 113a, 113b and 114 formed by the driver element 11 or, vice versa, the driver element 11 is shiftably held relative to the sliding element 2. A pair of retaining tabs 113a, 113b therefor is arranged opposite a retaining tab 114 transversely to the adjustment direction V1 or V2, so that the retaining tabs 113a, 113b and 114 each can partly enclose the edge of one of two retaining legs 23, 24 of the sliding element 2 and hence secure the sliding element 2 on the driver element 11 transversely to the adjustment direction V1, V2 and transversely to a mounting or shifting direction E.

The sliding element 2 is made of a particularly slidable material and can, in a manner known per se can be brought in engagement with the guide rail FS via a guiding slot 20 in the region of the protrusion 21. In this way, the driver element 11 itself need not be made of the particularly slidable and hence comparatively expensive (plastic) material, but merely the sliding element 2, which is dimensioned smaller, may be made of the slidable material. In operation of the window lifter, the sliding element 2 must however safely be fixed at the driver element 11, in order to be able to adjust the driver element 11 along the guide rail FS. At the same time, the assembly of the two elements 11 and 2 should be possible comparatively easily. In the present case, this is achieved via a two-stage latching connection.

For this purpose, the sliding element 2 includes a flexible or even elastic latching portion 210 on its protrusion 21, on which two latches 21a and 21b in the form of latching noses are formed. These latches 21a and 21b are arranged one behind the other along the mounting direction E and each protrude from the latch portion 210. For the intended flexibility of the latch portion 210, the latch portion 210 extends along the mounting direction E and in a bridge-like manner over a cutout which is provided at the protrusion 21. In addition, in order to make an arrestment via the individual latch 21b more easily releasable than an arrestment via both latches 21a and 21b, the latch portion 210 is provided with different wall thicknesses in supporting regions 210.1 and 210.2 carrying the latches 21a and 21b. The latches 21a and 21b thus can get in engagement with latch openings 111a, 111b, 111c, which are formed within the channel-like receptacle 111 of the driver element 11. These latch openings 111a, 111b and 111c also are arranged one behind the other along the mounting direction E. Consequently, when the sliding element 2 with its protrusion 21 is inserted into the receptacle 111, the first (main) latch 21a initially locks into place with a first latch opening 111a defining a mounting position. When the sliding element 2 is shifted further in the mounting direction E relative to the driver element 11 or, vice versa, the driver element 11 is shifted in opposite direction relative to the sliding element 2, the main latch 21a gets in engagement with the succeeding (main) latch opening 111b, via which a functional position of the two elements 11, 2 relative to each other is specified.

The main latch opening 111b in the present case is arranged between the two other latch openings 111a and 111c, so that depending on the mounting direction E the one or the other latch opening 111a or 111c specifies the mounting position. The depth and width of the latch openings 111b and 111c specifying the mounting position here is dimensioned such that the arrestment achieved thereby can be released again upon engagement of the (main) latch 21b with comparatively little expenditure of force, in order to further adjust the sliding element 2 and the driver element 11 relative to each other. On the other hand, when the main latch 21b engages into the middle main latch opening 111b, the further (secondary) latch 21a at the same time also engages into one of the further latch openings 111a or 111c. The arrestment provided thereby thus is distinctly more difficult to release again, so that the elements 2 and 11 then present in their functional position relative to each other are securely fixed at each other in operation of the window lifter.

In connection with a possible mounting process the sliding element 2 initially can be premounted to the guide rail FS and subsequently manually be connected with the driver element 11 integrally molded to the side window S. For this purpose, the sliding element 2 is clipped into the driver element 11 via the multi-stage latching connection defined by the latch openings 111a, 111b and 111c as well as the latches 21a and 21b. For this purpose, the sliding element 2 shiftably held at the guide rail FS via its guiding slot 20 must manually be inserted merely into the channel-like receptacle 111 of the driver element 11 (sufficiently far).

To ensure that the sliding element 2 then takes the position relative to the driver element 11 as shown in FIG. 4A and thus the two elements 2 and 11 can be arrested in their functional position relative to each other, the side window S is lowered in adjustment direction V1 and adjusted into a lower end position via the Bowden cable acting on the driver element 11. The sliding element 2, which in the mounting position protrudes from the driver element 11 in the adjustment direction V1, here strikes against a lower end stop, so that the driver element 11 is shifted in the adjustment direction V2 relative to the sliding element 2. The adjusting force acting on the driver element 11 here is sufficiently large, in order to release the arrestment of the mounting position and adjust the driver element 11 relative to the sliding element 2 to such an extent that both latches 21a and 21b then lock into place with the two latch openings 111a and 111b of the driver element 11. The sliding element 2 which in the functional position is properly locked into place with the driver element 11 then ensures an easy shiftability along the guide rail FS.

For a defined and permanently stable abutment on the guide rail FS, slightly convexly curved contact regions 201, 202, 203 and 204 are formed within the guiding slot 20 of the sliding element 2 locally and offset to each other. Furthermore, supporting webs 22a, 22b and 22c arranged one behind the other and protruding along the adjustment direction V1 or V2 are provided on the (narrower) retaining leg 24 of the sliding element 2 for abutment on the guide rail FS.

LIST OF REFERENCE NUMERALS 1 adapter
10 supporting structure
100 cutout
101 protective web (manipulation protection element)
102 rib structure
11 driver element
110a, 110b nipple chamber (interface for cable connection)
111 receptacle (interface for connection with sliding element)
111a, 111c latch opening 111b main latch opening
112 cable guide
113a, 113b retaining tab (1st gripping portion)
114 retaining tab (2nd gripping portion)
2 sliding element
20 guiding slot
201, 202, 203, 204 contact region
21 protrusion
210 latch portion
210.1, 210.2 supporting region
21a, 21b latch
22a, 22b, 22c supporting web
23 retaining leg
24 retaining leg
B broad supporting structure
b11 (projected) width of driver element
b102 width of rib structure
E mounting/shifting direction
F window lifter assembly
FS guide rail
S side window
SU pane lower edge
SW connecting sword (connecting portion)
V1, V2 adjustment direction
y transverse direction

The invention claimed is:

1. A window lifter assembly, comprising:
at least one guide rail extending along an adjustment direction,
a window pane configured to be moved along the adjustment direction,
a flexible cable for transmitting an adjusting force for adjusting the window pane,
a driver element which is connected with the cable; and
a sliding element connected with the driver element and being shiftably mounted on the at least one guide rail so that the driver element connected to the sliding element is adjustable along the at least one guide rail,
wherein the window pane has a generally linear lower edge and two side edges, the window pane including a connecting portion extending away from the lower edge to which an adapter is molded, the adapter and the window pane thereby being an integral unitary one-piece component,
wherein the adapter includes the driver element and includes a supporting structure, the supporting structure being configured to extend in the adjustment direction and in a transverse direction running generally perpendicular to the adjustment direction and substantially parallel to a pane plane defined by the window pane, and
wherein an extension of the supporting structure along the transverse direction is at least twice as large as an extension of the driver element along the transverse direction.

2. The window lifter assembly according to claim 1, wherein the supporting structure is adjacent the lower edge of the window pane and extends along an entire length of the lower edge of the window pane.

3. The window lifter assembly according to claim 1, wherein the supporting structure tapers towards the driver element.

4. The window lifter assembly according to claim 1, wherein the supporting structure forms a rib structure.

5. The window lifter assembly according to claim 4, wherein the rib structure extends along the lower edge of the window pane with a first length and the driver element extends along the lower edge of the window pane with a second length, the first length being at least twice as large as the second length.

6. The window lifter assembly according to claim 1, wherein the connecting portion of the window pane protrudes from the lower edge of the window pane.

7. The window lifter assembly according to claim 1, wherein the window pane is at least partly made of a plastic material and the adapter is injection-molded to the plastic material of the window pane.

8. The window lifter assembly according to claim 1, wherein the adapter includes a manipulation protection element which is configured to block movement of a manipulation tool guided along the window pane.

9. The window lifter assembly according to claim 8, wherein at least a portion of the manipulation protection element extends at an angle to the pane plane.

10. The window lifter assembly according to claim 8, wherein the adapter is integral with the manipulation protection element.

11. The window lifter assembly according to claim 8, wherein at least a portion of the manipulation protection element extends substantially perpendicularly to the pane plane.

12. The window lifter assembly according to claim 1, wherein the supporting structure is adjacent the lower edge of the window pane and extends over a majority of a width of the window pane.

* * * * *